(12) United States Patent
Inagaki et al.

(10) Patent No.: US 6,481,858 B2
(45) Date of Patent: Nov. 19, 2002

(54) MIRROR ASSEMBLY

(75) Inventors: Bunji Inagaki, Kasugai (JP); Yoshio Tsujiuchi, Kuwana (JP)

(73) Assignee: Kabushiki Kaisha Tokai-Rika-Denki-Seisakusho, Aichi-ken (JP)

( * ) Notice: Subject to any disclaimer, the term of this patent is extended or adjusted under 35 U.S.C. 154(b) by 0 days.

(21) Appl. No.: 09/731,042

(22) Filed: Dec. 7, 2000

(65) Prior Publication Data

US 2001/0003496 A1 Jun. 14, 2001

(30) Foreign Application Priority Data

Dec. 10, 1999 (JP) ............................................. 11-352330
Nov. 21, 2000 (JP) ........................................ 2000-354511

(51) Int. Cl.[7] .............................. G02B 5/08; G02B 7/18
(52) U.S. Cl. ........................ 359/841; 359/872; 248/476
(58) Field of Search ................................. 359/841, 872, 359/873, 874, 875, 876, 877; 248/476, 479, 480, 481, 487

(56) References Cited

U.S. PATENT DOCUMENTS 4,832,477 A * 5/1989 Torii et al. .................. 359/877
5,949,591 A * 9/1999 Whitehead ................... 359/841
5,966,254 A * 10/1999 Flowers et al. .............. 359/841
6,133,704 A * 10/2000 Yoshida et al. .............. 318/466
6,260,977 B1 * 7/2001 Inagaki ....................... 359/879

FOREIGN PATENT DOCUMENTS

JP          63-57352      3/1988
JP          2-48241       2/1990

* cited by examiner

*Primary Examiner*—Mark A. Robinson
(74) *Attorney, Agent, or Firm*—Nixon Peabody LLP; Thomas W. Cole (57) ABSTRACT

In a door mirror assembly for a vehicle, a case is supported at a door mirror stay provided at a vehicle door and mounted to a door mirror visor, whereby the door mirror visor is disposed above the door mirror stay. An overlap portion provided at the case and an overlap portion provided at an opening of the door mirror visor are overlapped one above the other and mounted, and a gap between the opening of the door mirror visor and the lower part of the case is thus stopped. Therefore, generation of wind noises caused by wind entering through the gap between the opening of the door mirror visor and the lower part of the case while a vehicle is in motion can be prevented.

15 Claims, 7 Drawing Sheets

MIRROR ASSEMBLY

BACKGROUND OF THE INVENTION

1. Field of the Invention

The present invention relates to a vehicular mirror assembly provided at a vehicle door.

2. Description of the Related Art

Figure 6:
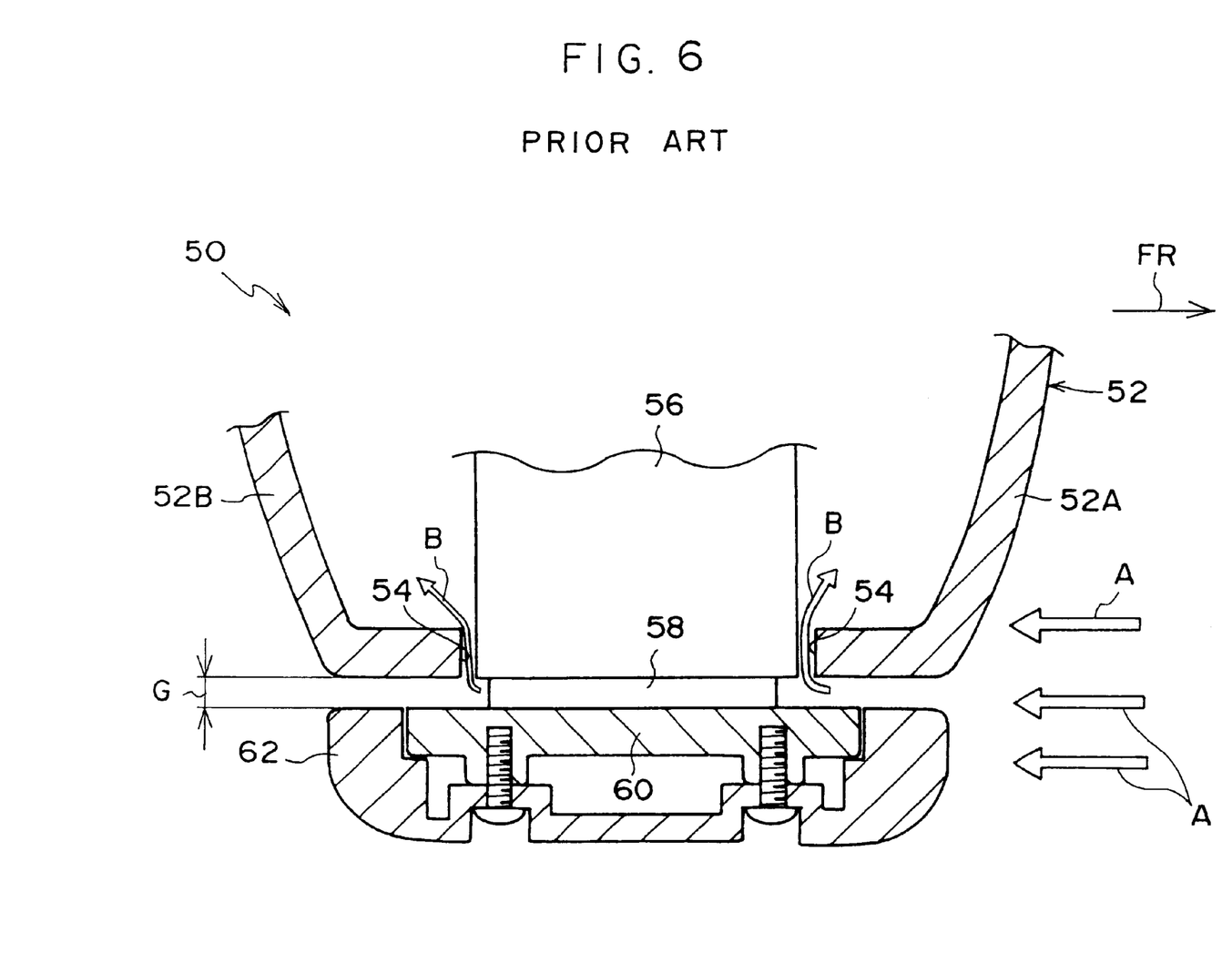
FIG. 6 is a cross-sectional view of a primary section of a conventional door mirror assembly for a vehicle.
Figure 7:
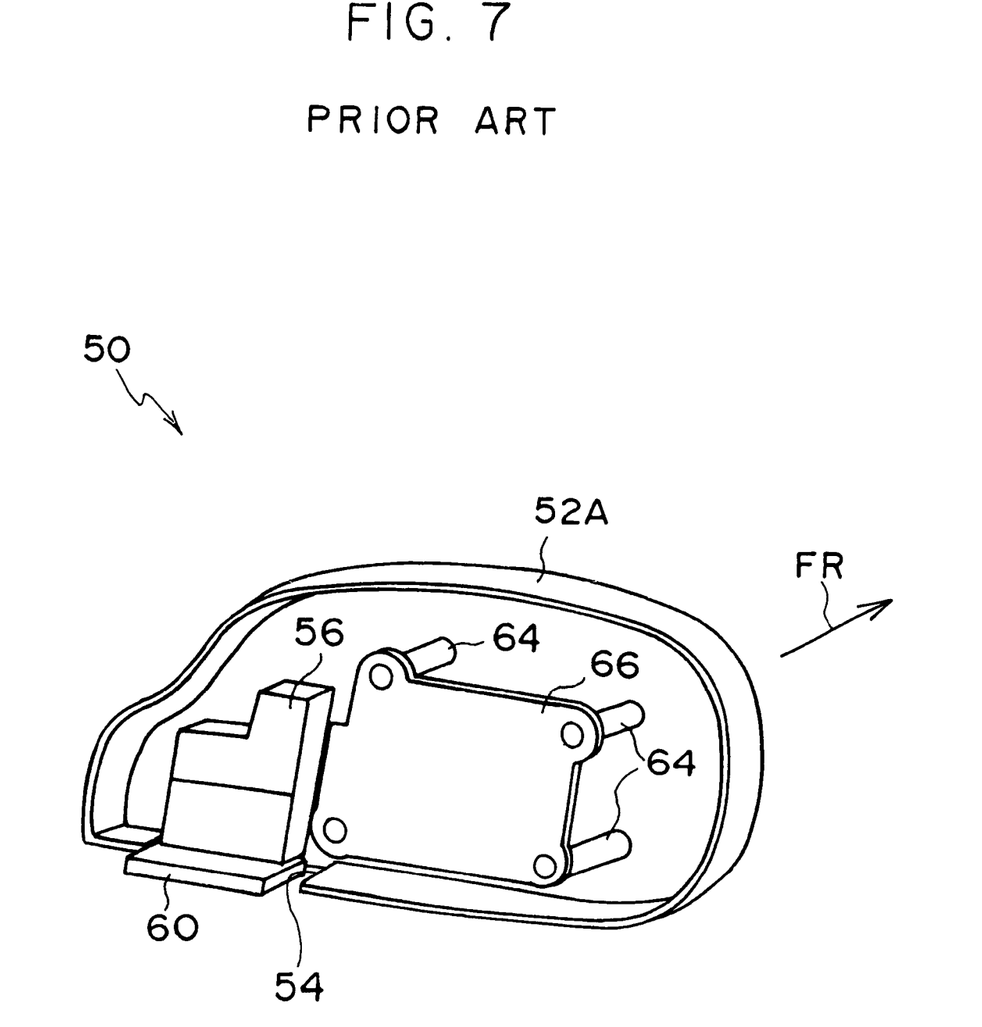
FIG. 7 is a perspective view of a visor cover, a case, and the like of the conventional door mirror assembly for a vehicle seen from a rear side of the vehicle.

As illustrated in FIG. 6 and FIG. 7, a vehicular door mirror assembly 50 includes a door mirror visor 52 made of a synthetic resin, and a rear-view mirror (not shown in the drawings) is held in the door mirror visor 52. The door mirror visor 52 is split into a visor cover 52A provided at a vehicle front side (i.e., the direction of arrow FR) and a visor rim 52B provided at a vehicle rear side, and the visor cover 52A and the visor rim 52B are fit together to form the door mirror visor 52, which has the shape of a shell. An opening 54 is formed at a bottom portion of the door mirror visor 52, and a part of a case 56 provided in the door mirror visor 52 is disposed in the opening 54. A motor (not shown in the drawings), a fixation shaft 58, and the like, which comprise a door mirror electric retraction mechanism, are provided within the case 56. The fixation shaft 58 protrudes from the lower part of the case 56 and the opening 54 of the door mirror visor 52, and a stand 60 is provided at a lower end portion of the fixed shaft 58. Here, as described in FIG. 7, in the door mirror assembly 50 for a vehicle, a plurality of pole-shaped visor bosses 64 are integrally formed to protrude within the door mirror visor 52 (the visor cover 52A and the visor rim 52B). A flat plate 66 is fixed to the visor bosses 64, and the door mirror visor 52 is fixed to the case 56 through the plate 66. The stand 60 is fixed to a door mirror stay 62 provided at a vehicle door (not shown in the drawings), and the door mirror visor 52 is thus mounted on the door mirror stay 62.

In such a door mirror assembly 50 for a vehicle, as the motor (not shown in the drawings) within the case 56 is driven, the case 56 fixed to the door mirror visor 52 rotates around the fixation shaft 58. As a result, the door mirror visor 52 can be rotated with the case 56 from an operational state (a state in which the door mirror visor 52 protrudes from the side of a vehicle) to a retracted state (a state in which the door mirror visor 52 is extended along the side of a vehicle).

However, in the door mirror assembly 50 for a vehicle as described above, a gap is generated between the inner circumference of the opening 54 provided at the bottom of the door mirror visor 52 and the outer circumference of the lower portion of the case 56 (hereinafter, this gap will be referred to as a "horizontal direction gap"). Thus, there has been the problem that, while a vehicle is travelling, wind enters (in the direction of arrows A and B) inside the door mirror visor 52 through this horizontal direction gap and passes through the door mirror visor 52, causing pressure fluctuation and wind noises.

Further, because the visor bosses 64 (a position where the case 56 is fixed to the door mirror visor 52) are distantly removed from the upper part of the door mirror stay 62, large discrepancies arise in the size of the gap dimension G (hereinafter, this gap will be referred to as a "vertical gap") between the bottom of the door mirror visor 52 and the upper part of the door mirror stay 62 due to manufacturing tolerance of the size and shape of the visor bosses 64. In other words, the dimension of this vertical gap is highly dependent on the accuracy of the visor bosses 64. In this case, forming the visor bosses 64 and the like within the door mirror visor 52 with high accuracy results in a decrease in manufacturing efficiency caused by manufacturing preparation, man-hours and the like, and leads to high costs.

SUMMARY OF THE INVENTION

In view of the facts described above, an object of the present invention is to obtain a vehicular mirror assembly that can restrict generation of wind noises without lowering manufacturing efficiency.

A first aspect of the present invention is a mirror assembly for mounting to the exterior of a vehicle, the assembly comprising: (a) a stay mountable to the vehicle exterior for supporting the assembly; (b) a support member having an outer periphery, the support member mounted on the stay; and (c) a holding member accommodating a mirror and mounted to the support member via a first fixation section, the holding member formed in a shell shape, having an opening with an inner periphery, wherein when the assembly is assembled and mounted to a vehicle, the support member is received in the opening so that the holding member is positioned, with the opening inner periphery abutting the support member outer periphery, at a second fixation section in a vicinity of the stay.

A second aspect of the present invention is a door mirror assembly for mounting to a door of a vehicle, the assembly comprising: a door mirror stay mountable on a door of a vehicle; a support having outer periphery, the support being provided above the door mirror stay and rotatably supported by the door mirror stay when the assembly is assembled and mounted on a vehicle; a door mirror visor having an opening with an inner periphery, the door mirror visor being mounted to the support by receiving the support in the opening and when the assembly is assembled and mounted on a vehicle, the door mirror visor holds a mirror and rotates back and forth from a retracted position and an operational position for providing a rear field view relative to the vehicle; and overlap portions provided at the outer periphery of the support and at the inner periphery, which overlap one another and impede air flow between the inner periphery of the opening and the outer periphery of the support.

A third aspect of the present invention is a mirror assembly for a vehicle, the assembly comprising: (a) a stay mountable to a vehicle; (b) a case having an outer periphery and accommodating a motor and at least one gear; (c) a mirror visor holding a mirror, the visor having a visor cover and visor rim which join to one another, the visor cover including an exterior surface, the visor having an opening with an inner periphery, the case being inserted into the opening when the assembly is assembled and mounted to a vehicle, with the outer periphery of the case and the inner periphery of the opening overlapping one another and positioned in a vicinity of the stay; and (d) a shaft protruding from the stay, upon which the mirror visor is rotatably supported by the case with the mirror visor rotatable from an operational position and a retracted position along with the case by operation of the motor driving the at least one gear.

DESCRIPTION OF THE PREFERRED EMBODIMENTS

Figure 1:
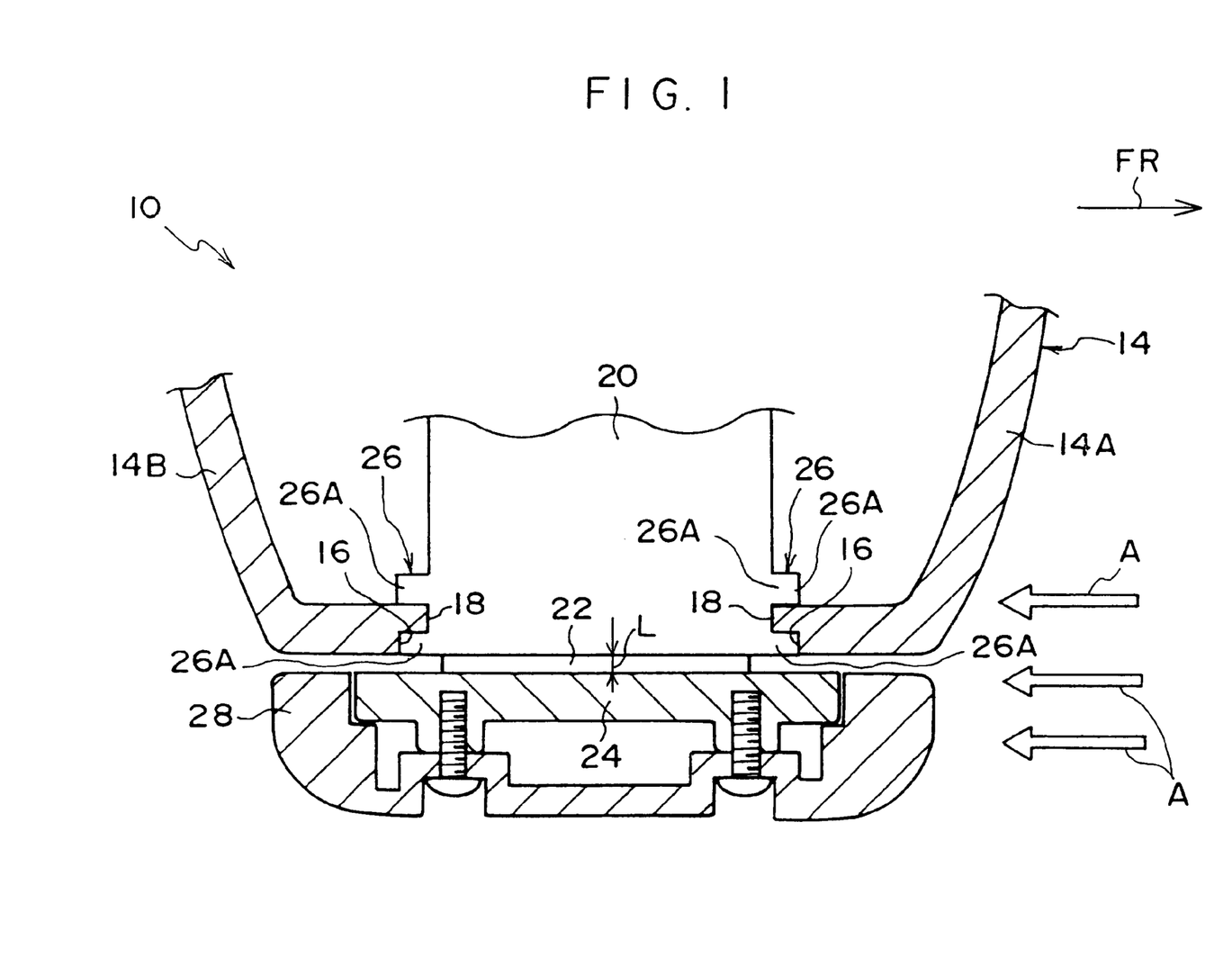
FIG. 1 is a cross-sectional view (taken along Line 1—1 of FIG. 2) of a primary section of a vehicular door mirror assembly relating to a first embodiment of the present invention.
Figure 2:
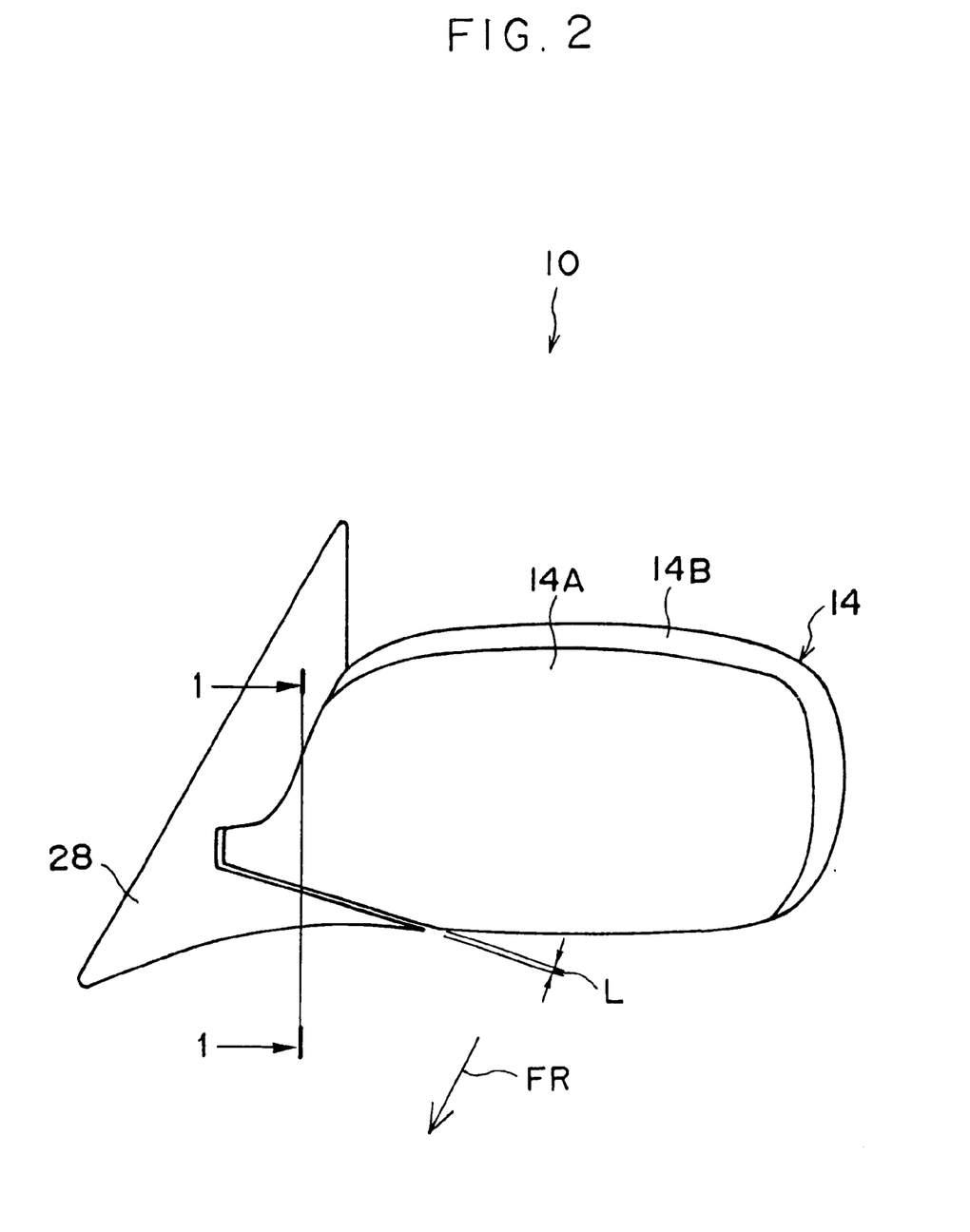
FIG. 2 is a perspective view of the vehicular door mirror assembly seen from a front side of a vehicle.
Figure 3:
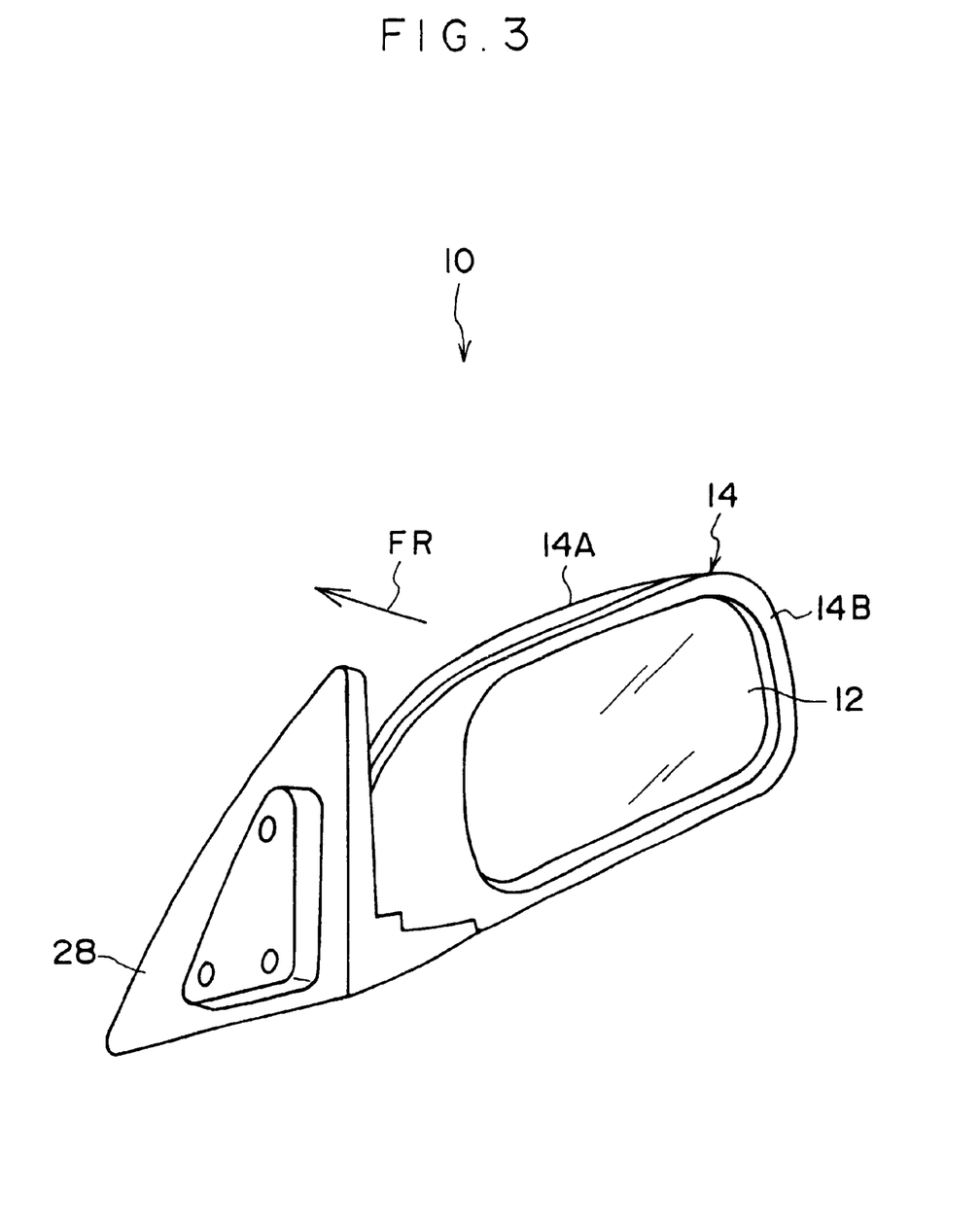
FIG. 3 is a perspective view of the vehicular door mirror assembly seen from a rear side of the vehicle.
Figure 4:
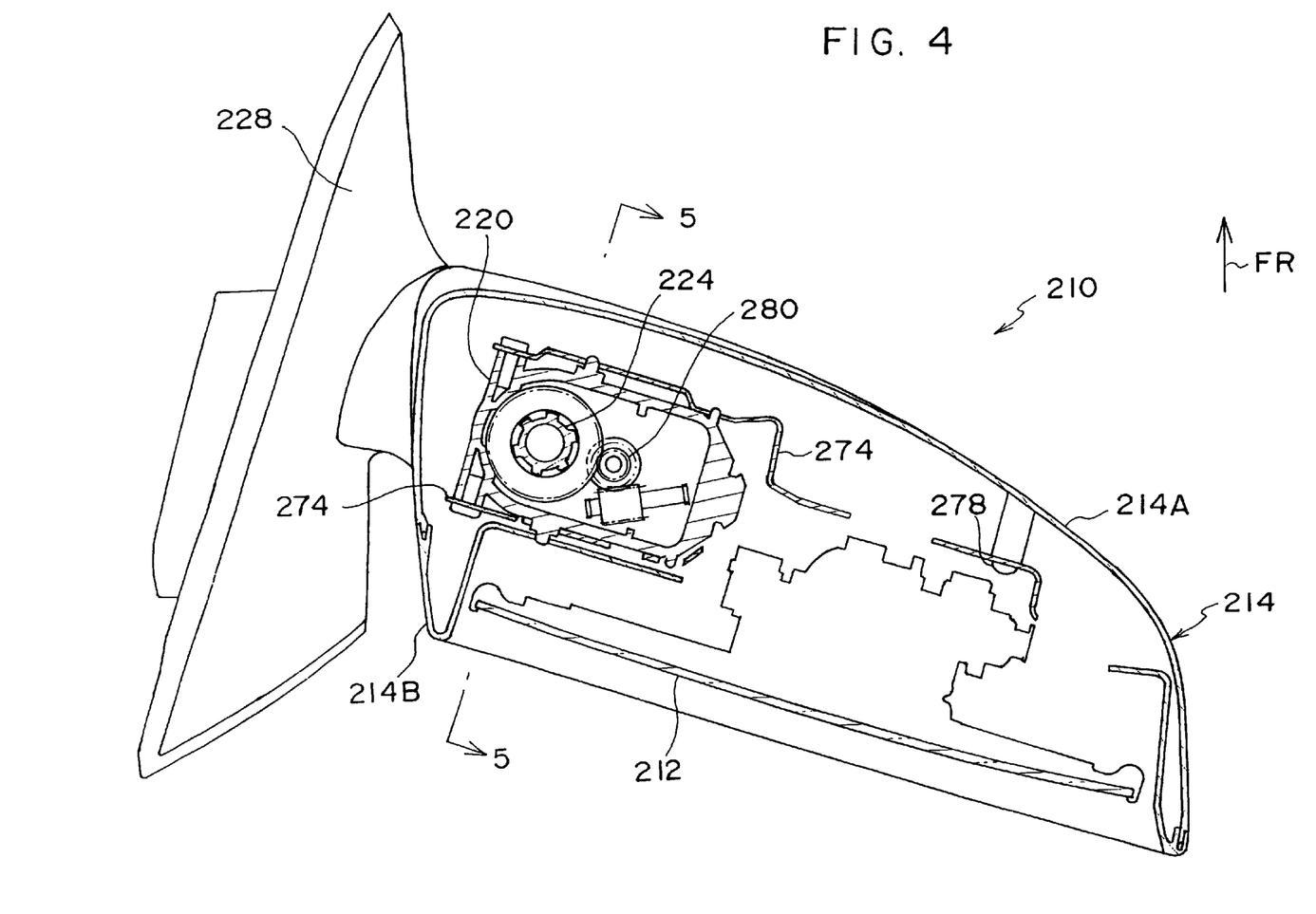
FIG. 4 is a horizontal cross-sectional view of a door mirror assembly 210 relating to a second embodiment of the present invention.

In FIG. 1, a primary section of a vehicular door mirror assembly 10 relating to a first embodiment of the present invention is illustrated in sectional view. In FIG. 2, the vehicular door mirror assembly 10 is illustrated in a perspective view from a front side of a vehicle. Moreover, in FIG. 3, the vehicular door mirror assembly 10 is illustrated in perspective view from a rear side of a vehicle. In FIG. 4, a horizontal sectional view of a door mirror assembly 210 relating to a second embodiment of the present invention, and, in FIG. 5A and FIG. 5B, sectional views taken along Line 5—5 of FIG. 4 are illustrated, respectively.

The vehicular door mirror assembly 10 relating to the first embodiment of the present invention includes a rear-view mirror 12, and the mirror 12 is held by a door mirror visor 14 made of a synthetic resin. Further, the door mirror visor 14 is split into a visor cover 14A at a vehicle front side and a visor rim 14B at a vehicle rear side, and the visor cover 14A and the visor rim 14B are fit together to form the door visor mirror 14, which has the shape of a shell.

An opening 16 is formed at a lower portion (a bearing surface) of the door mirror visor 14. The lower part of the shell-shaped door mirror visor 14 is exposed to outside through this opening 16. The opening 16 is formed in a fitting surface between the visor cover 14A and the visor rim 14B, and the fitting surface between the visor cover 14A and the visor rim 14B is recessed in accordance with the configuration of the outer circumference (rectangular shape) of a case 20. It should be noted that, though the opening 16 has a rectangular shape in the present embodiment, some other shape such as a circle may be applied, as long as it is shaped corresponding to the outer circumference of the case 20. An overlap portion 18 is formed to protrude all around the inner circumference of the opening 16, and the overlap portion 18 is thinner than any other part of the door mirror visor 14. In other words, in the present embodiment, the opening 16, when seen from below, has a shoulder, and the overlap portion 18 protrudes.

The case 20 having a shape of a box and serving as a support is housed within the door mirror visor 14 and within the opening 16. A motor and a gear (not shown in the drawings) that structure an electric retraction mechanism of the vehicular door mirror assembly 10, a spring and the like which structure a manual folding mechanism, and a fixation shaft 22 and the like are accommodated within the case 20. The fixation shaft 22 protrudes below from a lower end of the case 20 and the opening 16 of the door mirror visor 14. A flange-shaped stand 24 is provided at the lower end of the fixation shaft 22, and the stand 24 is integrated with the fixation shaft 22.

Around the entire outer periphery of the lower end of the case 20, an overlap portion 26 is formed to correspond to the overlap portion 18 of the door mirror visor 14. The overlap portion 26 has a pair of overlap projections 26A, and the pair of overlap projections 26A are provided opposing to and being spaced from each other in a vertical direction of the case 20 along the entire outer periphery of the case 20. Each overlap projection 26A protrudes substantially parallel to the overlap portion 18. The overlap portion 26 (the overlap projections 26A) overlaps above and below the overlap portion 18 to closely abut the overlap portion 18. Due to the fact that the overlap portion 18 is thinner than other parts of the door mirror visor 14, the lower surface of the case 20 (the overlap projection 26A in lower side) and the lower surface of the door mirror visor 14 form a continuous surface. Therefore, a state in which there is virtually no step at the bottom surface where the door mirror visor 14 and the case 20 join can be achieved, and pressure fluctuations caused by wind flowing between the bottom surface of the door mirror visor 14 and the stand 24 can be reduced.

Similar to conventional art, in the door mirror visor 14, tare weights of the visor cover 14A and the visor rim 14B are respectively supported (first fixation section) toward the case 20 via visor bosses (not shown in the drawings), and the case 20 is supported toward the body of the vehicle via the stand 24 and a door mirror stay 28.

Moreover, by the visor cover 14A and the visor rim 14B being fit together, the overlap portion 26 nips the overlap portion 18 between the pair of overlap protrusions 26A, and the door mirror visor 14 is thus fixed to the case 20 (second fixation section). Therefore, relative movement of the overlap portion 18 (the lower part of the door mirror visor 14) toward the overlap portion 26 (the lower part of the case 20) in a vertical direction in FIG. 1 is prevented, and generation of a gap between the inner circumference of the lower part of the door mirror visor 14 (the opening 16) and the outer periphery of the lower part of the case 20 is prevented. Further, the overlap portion 26 of the case 20 (the nipping and fixing position of the door mirror visor 14 to the case 20) is provided at a position adjacent to an upper part of the door mirror stay 28 described below (a dimension of a gap L in FIG. 1 is smaller than a dimension of a gap G in FIG. 4). In other words, a setting value for the gap (the gap L in FIG. 1 and FIG. 2) between the lower part of the door mirror visor 14 and the upper part of the door mirror stay 28 is set to be small.

The door mirror stay 28 is provided at a door (not shown in the drawings) of a vehicle, and the above-described stand 24 is fixed on the door mirror stay 28. By this structure, the case 20 is supported at an upper side of the door mirror stay 28 through the fixation shaft 22 described above, and the door mirror visor 14 is mounted above the door mirror stay 28.

The vehicular door mirror assembly 10 described above is formed such that, by the motor (not shown in the drawings) being driven, the case 20 fixed to the door mirror visor 14 is rotated around the fixation shaft 22, whereby the door mirror visor 14 is rotated around the fixation shaft 22 along with the case 20, and the door mirror visor 14 is rotated from the operational state to the retracted state.

Next, the operation of the present embodiment will be described.

In the vehicular door mirror assembly 10 having the structure described above, the case 20 is supported at the door mirror stay 28 provided at a door of a vehicle, the case 20 is accommodated within the opening 16 of the door mirror visor 14, and the door mirror visor 14 is thereby mounted above the door mirror stay 28.

Here, the overlap portion 26 (the overlap projections 26A) provided at the case 20 and the overlap portion 18 provided at the opening 16 (the lower part) of the door mirror visor 14 overlap one above the other. Due to this structure, the gap between the opening 16 of the door mirror visor 14 and the lower part of the case 20 is stopped. Therefore, the generation of wind noises caused by wind entering through a gap between the opening 16 of the door mirror visor 14 and the outer circumference of the lower part of the case 20 and passing through the inside of the door mirror visor 14 when the vehicle is in motion can be prevented.

Further, the door mirror visor 14 is split into the visor cover 14A at the vehicle front side and the visor rim 14B at the vehicle rear side, and the visor cover 14A and the visor rim 14B are fit together, whereby the overlap portion 26 nips the overlap portion 18 between the pair of overlap projections 26A. Therefore, relative movement of the overlap portion 18 with respect to the overlap portion 26 (i.e., in a vertical direction from the overlap portion 26 to the overlap portion 18) to generate a gap between the opening 16 of the door mirror visor 14 and the case 20 can be prevented. Therefore, wind noises caused by wind passing through the inside of the door mirror visor 14 when the vehicle is travelling can be further prevented.

Furthermore, by the overlap portion 26 (the pair of overlap projections 26A) nipping the overlap portion 18 therebetween, the door mirror visor 14 is fixed to the case 20. The fixation portion of the door mirror visor 14 to the case 20 illustrated in FIG. 1 (the second fixation section) does not function to support the tare weight of the door mirror visor 14 toward the case 20. Rather, similar to conventional art, the tare weight of the door mirror visor 14 is supported toward the case 20 via the fixation portion between the visor bosses (illustrations thereof are omitted) of the door mirror visor 14 and the case 20 (first fixation section). However, the door mirror visor 14 is also supported toward the case 20 at the opening 16 (second fixation section) which is distantly removed from this tare weight supporting section (first fixation section) so that the positioning of the mirror visor 14 in a vicinity of the opening 16 is secure. Here, the position at which the door mirror visor 14 is fixed to the case 20 by the overlap portion 18 of the door mirror visor 14 being nipped between the pair of overlap projections 26A (the position of the overlap portion 26 of the case 20) is in a position which is relatively close to the upper part of the door mirror stay 28. For that reason, variation in the size of the gap L becomes small, and the size (setting value) of this gap L can accordingly be narrowed.

Therefore, in the vehicular door mirror assembly 10 relating to the present embodiment, by providing the nipping and fixing position for positioning of the door mirror visor 14 to the case 20 in proximity to the upper part of the door mirror stay 28, the size of the gap between the upper part of the door mirror stay 28 and the bottom portion of the door mirror visor 14 (opening 16) is set to be small. By this structure, wind entering through the gap L can be reduced and generation of wind noises can be inhibited or prevented.

In the present embodiment, the pair of overlap projections 26A are disposed above and below the overlap portion 18 as the overlap portion 26 of the case 20. However, it should be noted that a structure in which only one overlap projection is provided at an overlap portion of a case, and in which the overlap portion of the support and the overlap portion of the door visor overlap one above the other, may also be used.

Further, in the present embodiment, the pair of mutually opposing overlap projections 26A are provided at the overlap portion 26 of the case 20 and the visor cover 14A and the visor rim 14B are fitted together, whereby the overlap portion 26 (the pair of overlap projections 26A) thus nips the overlap portion 18 of the door mirror visor 14 therebetween. Conversely, a structure in which the pair of mutually opposing overlap projections 26A are provided at the overlap portion of the door mirror visor and a visor cover and a visor rim are fitted together, whereby the overlapped portion (the pair of overlapped projections) nips the overlap portion of a case (support) therebetween, may also be used, and an effect similar to that described above can be obtained with such structure.

Figure 5A:
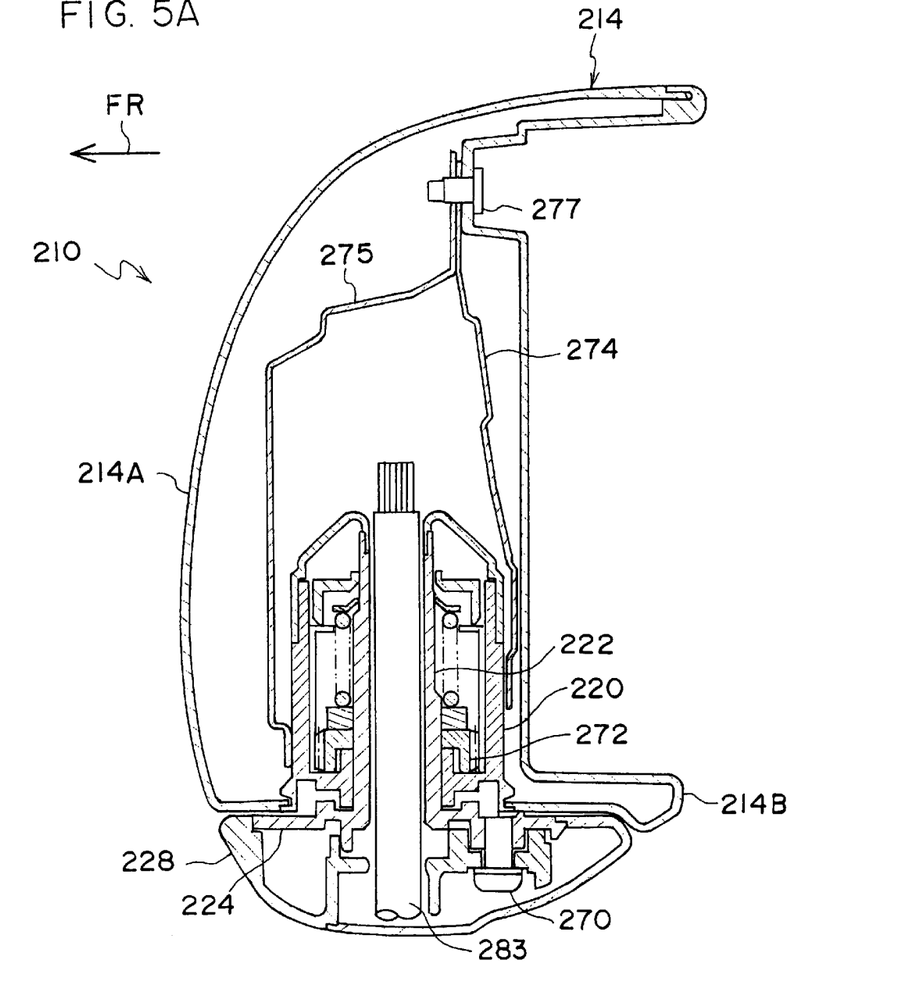
FIG. 5A is a cross-sectional view taken along Line 5—5 of FIG. 4.
Figure 5B:
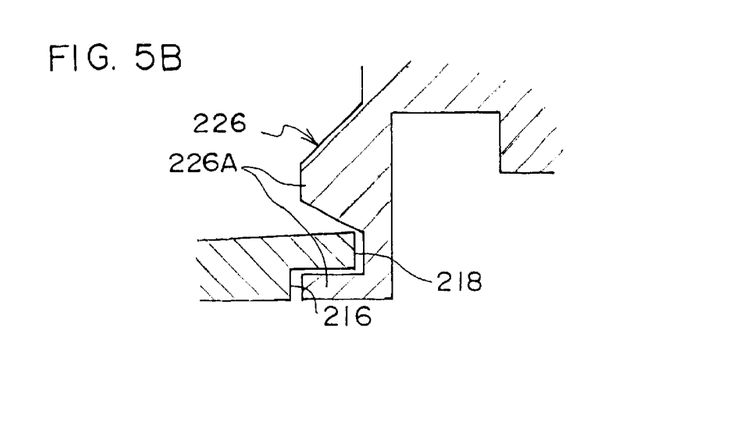
FIG. 5B is an enlarged view of a joint portion of a visor cover and a case illustrated in FIG. 5A.

In FIGS. 4, 5A and 5B, a second embodiment relating to the present invention is illustrated. In these examples, numerals prefixed by a "2" are given for parts similar to those described in the first embodiment, and since the operational effects thereof are similar to those described in the first embodiment, descriptions of the parts are omitted.

In FIG. 5A and FIG. 5B, though only one bolt 270 which fixes a stand 224 to a stay 228 is illustrated, other fixation bolts are present at a right angle to the surface of the page. Moreover, a fixation shaft 222 is integrally provided in an upright position from the stand 224, a fixed gear 272 is fixed to this fixation shaft 222, and further, a case 220 is mounted rotatably. A pair of plates 274 and 275 is fixed to the case 220, and a visor rim 214B and a visor cover 214A are stationarily mounted on these plates 274 and 275 via fasteners 277 and 278 (first fixation section). A pinion 280 that deceleration-driven by a motor within the case 220 engages with the fixed gear 272 and revolves, whereby the door mirror visor 214 is rotated around the fixation shaft 222 from an operational position to a retracted position. Further, the fixation shaft 222 is hollow and a bundle of wire harnesses 283 fed from a vehicle are led through the hollow interior to an interior of the mirror visor 214 to supply electricity to a motor or the like.

In this embodiment as well, a thin overlap portion 218 is provided at an opening 216 and overlapped with a pair of overlap portions 226A of the case 220, and positioning of the door mirror visor 214 is made (second fixation section).

Accordingly, a gap L between a door mirror stay 228 and the door mirror visor 214 in an axial direction along the fixation shaft 222 can be of a value that is significantly small. Moreover, similar to the first embodiment, a gap between the inner circumference of the opening 216 and the outer circumference of the case 220 is eliminated, and the overlap portion 218 at the circumference of the opening 216 is made thinner, so that a gap between the exterior lower surface of the door mirror visor 214 and the exterior lower surface of the case 220 can be eliminated.

What is claimed is:

1. A mirror assembly for mounting to the exterior of a vehicle, the assembly comprising:
    (a) a stay mountable to the vehicle exterior for supporting the assembly;
    (b) a support member having an outer periphery, the support member mounted on the stay; and
    (c) a holding member accommodating a mirror and mounted to the support member via a first fixation section, the holding member formed in a shell shape, and having a bottom portion with only a single opening leading to an interior, said opening having an inner periphery, wherein when the assembly is assembled and mounted to a vehicle, the support member is received in the opening so that the holding member is positioned, with the opening inner periphery abutting the support member outer periphery such that air flow into said interior is impeded, at a second fixation section in a vicinity of the stay,
wherein an overlapping section is provided at the inner periphery of the opening of the mirror holding member and the outer periphery of the support member.

2. The mirror assembly of claim 1, wherein the overlapping section consists of a thin portion formed at the inner periphery of the opening and a protruding lip formed at the outer periphery of the support member.

3. The mirror assembly of claim 2, wherein the inner periphery having a shoulder between the inner periphery and the protruding lip, with the shoulder receiving the lip when the support member is received in the opening, with the lip having its exterior surface substantially flush with an exterior surface of the supporting member.

4. The mirror assembly of claim 2, wherein the outer periphery of the support member includes a recess receiving the thin portion of the opening of the holding member.

5. The mirror assembly of claim 1, wherein the holding member includes first and second sections joined together, with one section forming part of the inner periphery of the opening, and the other section forming the remaining part of the inner periphery of the opening.

6. The mirror assembly of claim 1, wherein a shaft protrudes from the stay, upon which the holding member is rotatably supported thereabout, with the holding member opening disposed proximate and substantially parallel to an opposing surface of the stay.

7. A door mirror assembly for mounting to a door of a vehicle, the assembly comprising:
a door mirror stay mountable on a door of a vehicle;
a support having outer periphery, the support being provided above the door mirror stay and rotatably supported by the door mirror stay when the assembly is assembled and mounted on a vehicle;
a door mirror visor having a bottom portion with only a single opening leading to an interior, said opening having an inner periphery, the door mirror visor being mounted to the support by receiving the support in the opening and when the assembly is assembled and mounted on a vehicle, the door mirror visor holds a mirror and rotates back and forth from a retracted position and an operational position for providing a rear field view relative to the vehicle; and
overlap portions provided at the outer periphery of the support and at the inner periphery, which overlap one another and impede air flow between the inner periphery of the opening and the outer periphery of the support to prevent air flow into said interior.

8. The door mirror assembly of claim 7, wherein the door mirror visor includes a visor cover and a visor rim which join together, the visor cover being positioned forward of the visor rim, relative to the vehicle, when the door mirror visor is in the operational position, and a pair of overlap portions nip another overlap portion therebetween to fasten the door mirror visor to the support and position the door mirror visor and the door mirror stay relative to one another.

9. The door mirror assembly of claim 8, wherein the overlap portions fastening the door mirror visor to the support are provided proximate to an upper part of the door mirror stay.

10. The door mirror assembly of claim 7, wherein when the overlap portions overlap one another, a lower overlap portion is recessed flush into either one of an exterior surface of the door mirror and the support, forming a substantially continuous surface extending from the support to the door mirror visor.

11. The door mirror assembly of claim 10, wherein a pair of overlap portions define a groove between each other, which receives another overlap portion.

12. A mirror assembly for a vehicle, the assembly comprising:
(a) a stay mountable to a vehicle;
(b) a case having an outer periphery and accommodating a motor and at least one gear;
(c) a mirror visor holding a mirror, the visor having a visor cover and visor rim which join to one another, the visor cover including an exterior surface, the visor having a bottom portion with only a single opening, said opening having an inner periphery, the case being inserted into the opening when the assembly is assembled and mounted to a vehicle, with the outer periphery of the case and the inner periphery of the opening overlapping one another and positioned in a vicinity of the stay; and
(d) a shaft protruding from the stay, upon which the mirror visor is rotatably supported by the case with the mirror visor rotatable from an operational position and a retracted position along with the case by operation of the motor driving the at least one gear.

13. The door mirror assembly of claim 12, wherein a part of the inner periphery of the opening is formed the visor cover, and another par is formed by the visor rim.

14. The door mirror assembly of claim 13, wherein one of the overlapping peripheries is an exterior surface, and is recessed into the other periphery, which forms a substantially smooth interface joint between the case and the mirror visor.

15. The door mirror assembly of claim 14, wherein a groove, which receives the periphery of the opening, is provided on the outer periphery of the case.

* * * * *